United States Patent
Hatano

(10) Patent No.: US 9,372,691 B2
(45) Date of Patent: Jun. 21, 2016

(54) METHOD OF MANUFACTURING DISPLAY DEVICE

(71) Applicant: NICHIA CORPORATION, Anan-shi (JP)

(72) Inventor: Tomohiko Hatano, Naruto (JP)

(73) Assignee: NICHIA CORPORATION, Anan-shi (JP)

( * ) Notice: Subject to any disclaimer, the term of this patent is extended or adjusted under 35 U.S.C. 154(b) by 13 days.

(21) Appl. No.: 14/571,288

(22) Filed: Dec. 16, 2014

(65) Prior Publication Data

US 2015/0170899 A1    Jun. 18, 2015

(30) Foreign Application Priority Data

Dec. 16, 2013 (JP) ................................. 2013-259498

(51) Int. Cl.
*H01L 21/338* (2006.01)
*G06F 9/30* (2006.01)
*G09F 27/00* (2006.01)

(52) U.S. Cl.
CPC ................ *G06F 9/30* (2013.01); *G09F 27/008* (2013.01); *Y10T 29/49826* (2015.01); *Y10T 29/49963* (2015.01)

(58) Field of Classification Search
CPC ... G06F 9/30; G06F 27/008; Y10T 29/49826; Y10T 29/49963

USPC .......................................................... 438/167
See application file for complete search history.

(56) References Cited

U.S. PATENT DOCUMENTS

| 7,413,832 B2 * | 8/2008 | Koike | C09G 1/02 427/160 |
| 2010/0195078 A1 * | 8/2010 | Horiuchi | G03F 7/70558 355/71 |

FOREIGN PATENT DOCUMENTS

| JP | 5-67809 | 3/1993 |
| JP | 3232392 B2 | 9/1996 |
| JP | 4349032 B2 | 3/2005 |
| JP | 5075852 B2 | 8/2010 |
| JP | 2013-30401 | 2/2013 |

* cited by examiner

*Primary Examiner* — Thanh T Nguyen
(74) *Attorney, Agent, or Firm* — Mori & Ward, LLP

(57) ABSTRACT

A method includes: preparing a substrate having a plurality of light sources on a front side, a case to be provided on a back side of the substrate, the case having a side wall along a periphery of the case, and a mask having a light shielding member and a side wall projecting to the back side at a periphery of the mask, the light shielding member having a plurality of windows for transmitting light from the plurality of light sources, an outer shape of the mask being larger than an outer shape of the substrate and an outer shape of the case when viewed from the front side; fixing the case, the substrate, and the mask; filling a fluid material between a side wall of the case and a side wall of the light shielding member; and hardening the fluid material.

18 Claims, 3 Drawing Sheets

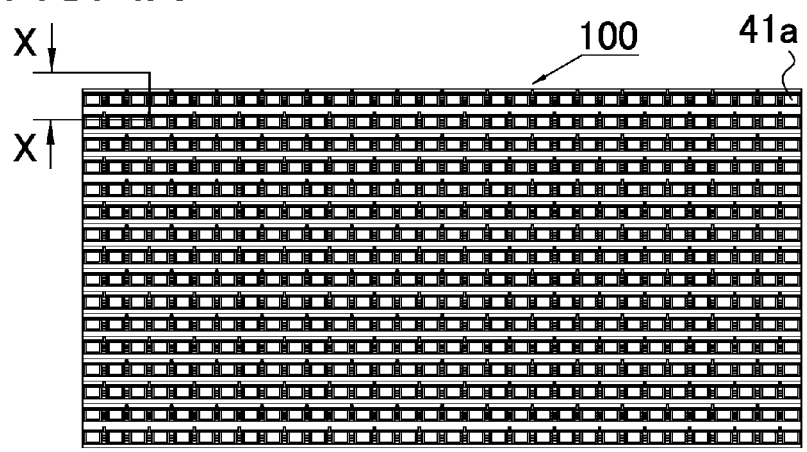
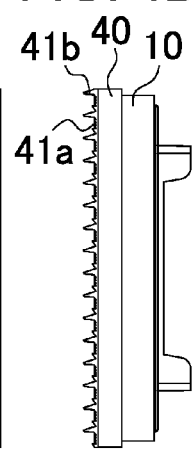
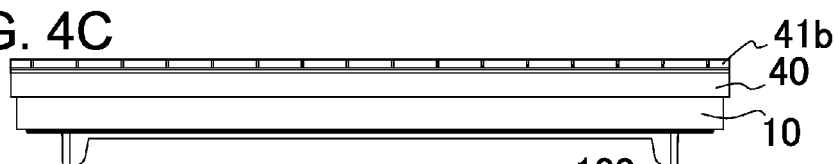
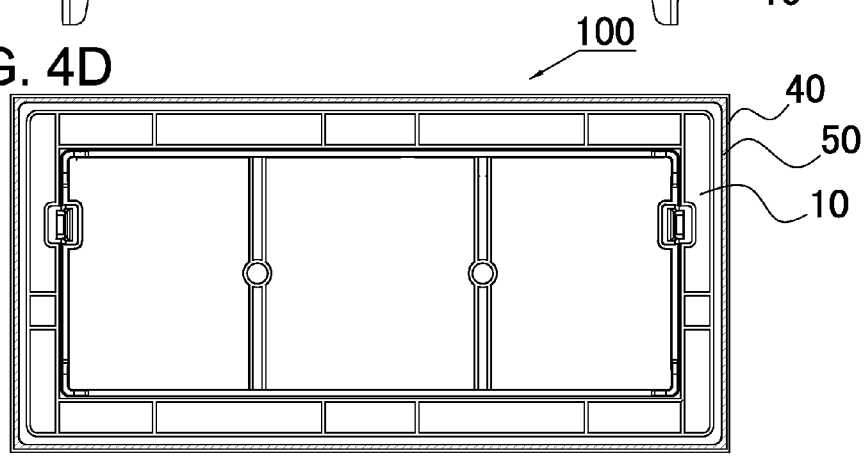

METHOD OF MANUFACTURING DISPLAY DEVICE

BACKGROUND OF THE INVENTION

1. Field of the Invention

The present disclosure relates to a method of manufacturing a display device.

2. Description of Related Art

Conventionally, there is proposed a display device having a structure that a substrate provided with a plurality of light emitting elements is disposed on a front side of a case and a mask covers a front side of a substrate.

In a conventional display device, it is considered that entry of water between a mask and a case is prevented by interposing packing at an outer periphery of a display device. However, in this case, the mask deforms due to presence of the packing which, may result in uneven brightness depending on the viewing position.

SUMMARY OF THE INVENTION

Therefore, one object of the present invention is to provide a method of manufacturing a display device with a waterproof property and in which uneven brightness depending on a viewing position is hardly generated.

According to the present invention, the above problem is solved by providing a method of manufacturing a display device, the method including: preparing a substrate provided with a plurality of light sources on a front side of the substrate; preparing a case to be provided on a back side of the substrate, the case having a side wall along a periphery of the case; preparing a mask to be provided on the front side of the substrate, the mask having a light shielding member and a side wall projecting to the back side at a periphery of the mask, the light shielding member having a plurality of windows for transmitting light from the plurality of light sources, an outer shape of the mask being larger than an outer shape of the substrate and an outer shape of the case when viewed from the front side; fixing the case, the substrate, and the mask; filling a fluid material between the side wall of the case and the side wall of the mask; and hardening the fluid material.

According to embodiments of the present invention, a method of manufacturing a display device with a waterproof property and in which uneven brightness depending on a viewing position is hardly generated.

BRIEF DESCRIPTION OF THE DRAWINGS

FIG. 4A is a front view of the display device, FIG. 4B is a side view of a display device illustrated in FIG. 4A, FIG. 4C is a bottom view of a display device illustrated in FIG. 4A, and FIG. 4D is a back view of a display device illustrated in FIG. 4A.

DETAILED DESCRIPTION OF EMBODIMENT(S)

Hereinafter, embodiments of the present invention will be described with reference to the drawings. The embodiment described below is exemplification of a method of manufacturing a display device that embodies the technical idea of the present invention, and is not intended to limit the present invention to the following embodiment. Also, unless specifically stated otherwise, dimensions, materials, and shapes of components, positional relations therebetween, and the like are mere examples, and are not intended to limit the scope of the present invention.

Figure 2:
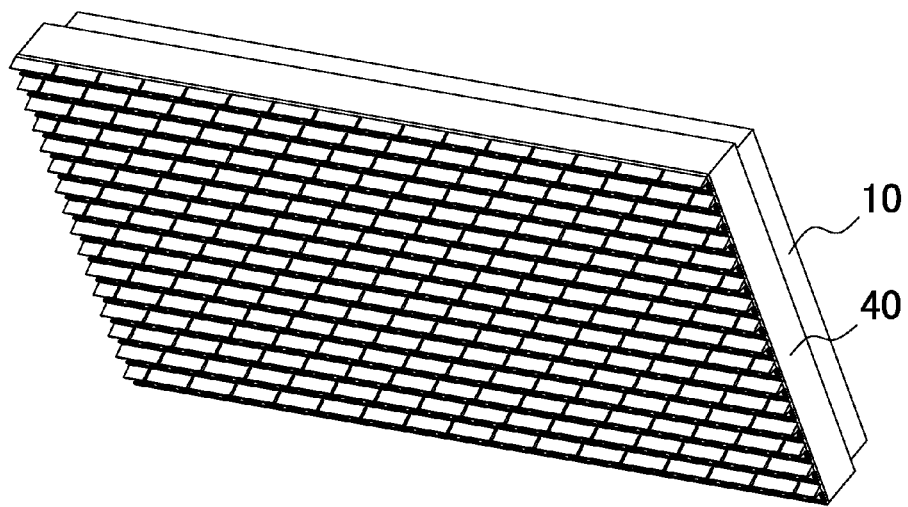
FIG. 2 is a perspective view illustrating an external appearance of a display device obtained by a method of manufacturing according to an embodiment of the present invention.
Figure 3:
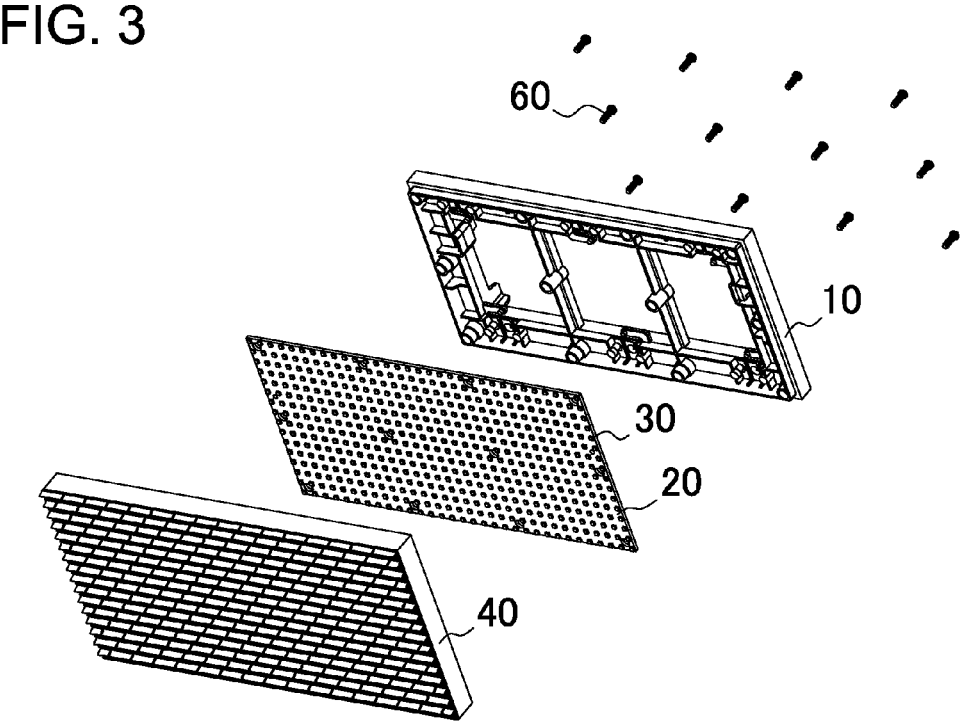
FIG. 3 is an exploded view schematically illustrating a configuration of a display device obtained by a method of manufacturing according to an embodiment of the present invention.

FIGS. 1A to 1F are views illustrating a method of manufacturing a display device according to the present embodiment. FIG. 2 is a perspective view illustrating an external appearance of a display device manufactured by a manufacturing method according to the present embodiment. FIG. 3 is an exploded view schematically illustrating a configuration of the display device illustrated in FIG. 2. FIGS. 4A to 4D are views illustrating an external appearance of a display device 100 obtained by the manufacturing method according to an embodiment of the present invention. More specifically, FIG. 4A is a front view of the display device 100 when the device is viewed from a front side which is a viewing side, FIG. 4B is a side view of the display device 100 illustrated in FIG. 4A when the device is viewed from a right side, FIG. 4C is a bottom view of the display device 100 illustrated in FIG. 4A when the device is viewed from a bottom side, and FIG. 4D is a back view of the display device 100 illustrated in FIG. 4A when the device is viewed from a back side.

Figure 1A:
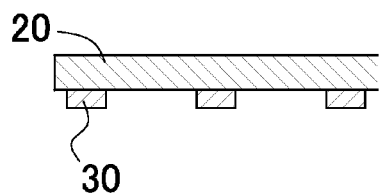
FIGS. 1A to 1F are partial end surface views illustrating a method of manufacturing a display device according to an embodiment of the present invention.
Figure 1B:
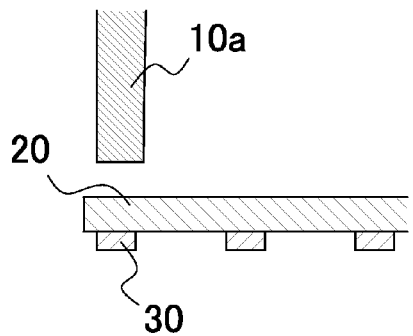
Figure 1C:
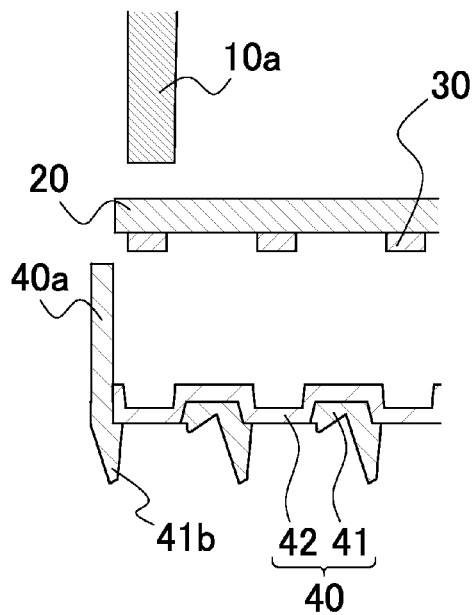
Figure 1D:
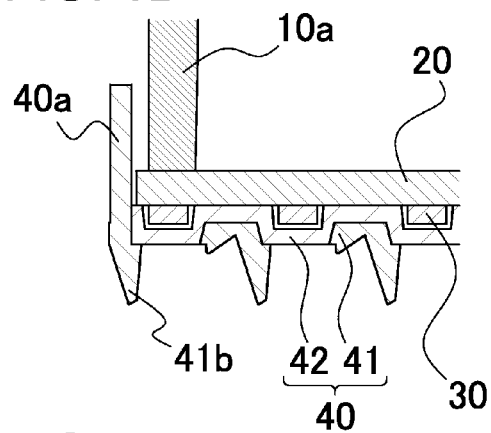
Figure 1E:
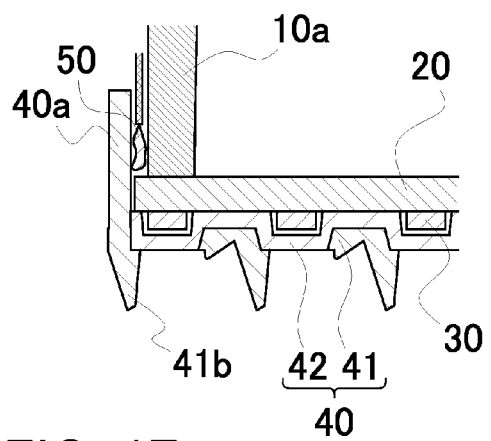
Figure 1F:
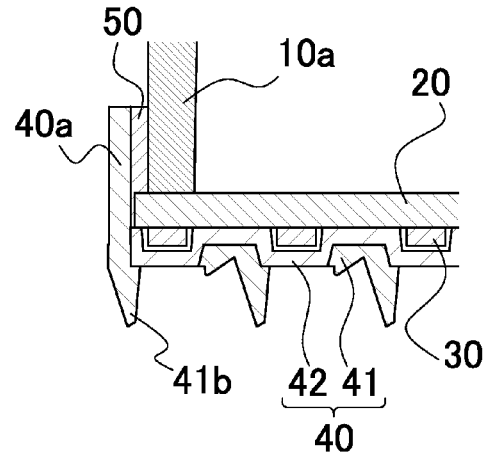

As illustrated in FIGS. 1A to 1F, a method of manufacturing a display device according to an embodiment of the present invention includes: preparing a substrate 20 provided with a plurality of light sources on a front side of the substrate (first step, see FIG. 1A); preparing a case 10 to be provided on a back side of the substrate 20, the case 10 having a side wall along a periphery of the case 10 (second step, see FIG. 1B); preparing a mask 40 to be provided on the front side of the substrate 20, the mask 40 having a light shielding member 41 and side walls 40a projecting to the back side at a periphery of the mask 40, the light shielding member 41 having a plurality of windows 41a for transmitting light from the plurality of light sources, an outer shape of the mask 40 being larger than an outer shape of the substrate 20 and an outer shape of the case 10 when viewed from the front side (third step, see FIG. 1C); fixing the case 10, the substrate 20, and the mask 40 (fourth step, see FIG. 1D); filling a fluid material 50 between side walls 10a of the case 10 and side walls 40a of the mask (fifth step, see FIG. 1E); and hardening the fluid material 50 (sixth step, see FIG. 1F).

Conventionally, in order to improve waterproofness of a display device, a packing is interposed between a mask and a case at an outer periphery of the display device. However, it is found that the mask deforms due to an elastic force of the packing and a positional relation between a light emitting element and the mask is locally disturbed, and as a result, brightness of the display device may become uneven when the display device is viewed from the observer's side depending on a viewing position. According to the embodiment of the present invention, instead of fixing the mask and the case with the packing interposed therebetween, waterproofness is ensured by fixing the mask and the case, filling the fluid material between the side wall of the mask and the side wall of the case, and then hardening the fluid material. In this manner, it is possible to prevent the mask from being deformed due to presence of packing and to prevent uneven brightness depending on a viewing position, and it is possible to manufacture a display device having superior waterproofness.

Hereinafter, with reference to the drawings, a method of manufacturing the display device 100 will be described in order.

First Step

First, as illustrated in FIG. 1A and FIG. 3, a substrate 20 provided with a plurality of light emitting elements 30 on the front side of the substrate 20 is prepared.

The substrate 20 has a substantially flat plated shape. Examples of the substrate 20 include a glass epoxy substrate and a glass composite substrate. The substrate 20 may have a length of 50 mm to 150 mm, a width of 150 mm to 250 mm, and a thickness of 1.5 mm to 2.5 mm, for example. Further, the substrate 20 is provided with wiring.

In the present embodiment, in the front view, the outer shape of the substrate 20 is larger than the outer shape of the case 10 to be described below. In this manner, it is possible to achieve high resolution when a plurality of display devices are arranged in a matrix to constitute a single display system. Specifically, in the present embodiment, the side walls 10a of the case and the corresponding side walls 40a of the mask are needed to be spaced apart from each other to some extent in order to ensure a gap into which a fluid material is poured. In the case where the substrate 20 having the same size as that of the case 10 is provided, a distance between an outermost light emitting element of the display device and a periphery of the display device increases by the gap into which the fluid material is poured. In other words, providing a display system with a plurality of display devices will increase a distance between the outermost light emitting elements of respective adjacent display devices. In general, a display system is configured such that a distance between adjacent ones of light emitting elements is constant over an entire area of the system, and therefore if a distance between an outermost light emitting element of the display device and a periphery of the display device is large, the distance between the light emitting elements needs to become large over an entire area of the system. For this reason, the outer shape of the substrate 20 is larger than the outer shape of the case 10 so that the substrate 20 protrudes from the case 10. Thus, it is possible to provide a display device capable of constituting a high-resolution display system while reducing an influence of the gap into which the fluid material is poured.

The plurality of light emitting elements 30 mounted on the substrate 20 may be mounted on the substrate 20 at intervals of 3 mm to 20 mm, preferably 3 mm to 10 mm, and more preferably 4 mm to 8 mm, for example. In the specification, the expression "the interval between the light emitting elements 30" refers to a distance between the centers of two adjacent light emitting elements 30 that are adjacent to each other.

In the case where the plurality of light emitting elements 30 are mounted at small intervals, in general, a viewing angle tends to be narrow unless a thickness of the mask 40 (a distance between windows 41 a and the substrate 20) is made thin, but in the case where the mask 40 is made thin, the mask 40 tends to deform easily upon fixation. However, the embodiment of the present invention is also effective even in the case where the mask 40 is made thin, because deformation of the mask 40 can be suppressed. Specifically, by setting the mask 40 to have a thickness of 1 mm to 5 mm, and preferably 1.5 mm to 3 mm, for example, it is possible to provide a display device in which uneven brightness depending on a viewing position is hardly generated.

As the light sources, it is possible to use the light emitting elements 30 such as light-emitting diodes. The light emitting elements 30 can have a height of 1.0 mm to 3.0 mm, a width of 1.0 mm to 3.0 mm, and a thickness of 0.5 mm to 2.5 mm, for example.

Second Step

Next, as illustrated in FIG. 1B and FIG. 3, the case 10 to be provided on the back side of the substrate 20 is prepared. The side walls 10a is provided at the periphery of the case 10.

Preferably, outer surfaces of the side walls 10a of the case is roughened. This can increase a contact area between the outer surfaces of the side walls 10a of the case and the fluid material 50 and improve adhesion in a fifth step, to be described later, and therefore it is possible to provide a display device having further superior waterproofness.

Examples of a material of the case 10 include a polycarbonate resin and a nolyl resin. Further, a shape of the case 10 viewed from the front side may be rectangular, as shown in FIGS. 2 to 4.

Third Step

Next, as illustrated in FIG. 1C and FIG. 3, the mask 40 to be provided on the front side of the substrate 20 is prepared. The mask 40 includes the light shielding member 41 having the plurality of windows 41a for transmitting light from the light emitting elements 30. When viewed from the front side, an outer shape of the mask 40 is larger than the outer shape of the substrate 20 and the outer shape of the case 10, and includes the side walls 40a protruding to the back side at the periphery of the mask.

The mask 40 may have a length of 50 mm to 150 mm and a width of 150 mm to 250 mm, for example.

In a fourth step to be described below, the side walls 40a of the mask are fixed so as to surround the side walls 10a of the case, and thus a gap is formed between the side walls 40a of the mask and the side walls 10a of the case. At this time, it is sufficient that the inner surfaces of the side walls 40a of the mask and the corresponding outer surfaces of the side walls 10a of the case face each other. A region where the side walls 40a of the mask and the side walls 10a of the case facing each other is preferably from 1.5 mm to 5.0 mm, and more preferably from 3.0 mm to 4.0 mm, for example, in a depth direction of the display device (a vertical direction in FIG. 1E). This is because if the region is equal to or smaller than 1.5 mm, the fluid material 50 cannot sufficiently be filled into the depth direction and therefore waterproofness may become poor, and if the region is equal to or greater than 5.0 mm, it may become difficult to fabricate the mask 40 efficiently.

In addition, the inner surfaces of the side walls 40a of the mask are preferably roughened. This can increase a contact area between the inner surfaces of the side walls 40a of the mask and the fluid material 50 and improve adhesion in the fifth step to be described below, and therefore it is possible to provide a display device having further superior waterproofness.

As illustrated in FIG. 4A, FIG. 1F, etc., the mask 40 includes the light shielding member 41 having the plurality of windows 41 a for respectively transmitting light from the plurality of light emitting elements 30. The plurality of windows 41a can be disposed in a matrix, for example. In this case, a shape of the windows 41a is not particularly limited.

Examples of a material of the light shielding member 41 include a polycarbonate resin, and a nolyl resin. It is particularly preferable to use a polycarbonate resin to which a black pigment is added, so that it is possible to reduce reflection of external light and to maintain favorable visibility of the display device.

Further, a publicly known configuration can be employed in order to prevent entry of water from the front side of the display device 100. For example, as illustrated in FIGS. 1A to 1F, FIG. 4A, and the like, in the embodiment of the present invention, a light-transmissive member 42 is provided so as to seal the plurality of windows 41a provided for the mask 40. In this manner, the mask 40 can prevent entry of water from the front side, and therefore it is possible to provide a display device having further superior waterproofness.

Examples of a material of the light-transmissive member 42 include a polycarbonate resin, and a nolyl resin. It is particularly preferable to use a polycarbonate resin having superior light transmissivity, so that it is possible to emit light efficiently from the light emitting elements 30 through the windows 41a.

Further, as illustrated in FIGS. 4B and 4C, the light shielding member 41 may be provided with a plurality of flanges 41b. In the case where the plurality of windows 41a are arranged in a matrix, each of the plurality of flanges 41b can be linearly arranged along a row direction. In this manner, the external light (e. g., sunlight and illumination) can be shielded effectively, so that it is possible to provide a display device having superior visibility. The shape of the flanges 41b is not particularly limited.

The mask 40 can be formed by two-color molding using the light shielding member 41 and the light-transmissive member 42, for example. In this manner, it is possible to stably fabricate the mask 40 having a desired shape. In the present embodiment, the light shielding member 41 and the side walls 40a are integrally formed.

Fourth Step

Next, as illustrated in FIG. 1D and FIG. 2, the case 10, the substrate 20, and the mask 40 are fixed. At this time, the fixation is performed so that the plurality of light emitting elements 30 mounted on the substrate 20 respectively correspond to the windows 41a of the mask 40.

When the case 10, the substrate 20, and the mask 40 are fixed as illustrated in FIG. 1D, a gap into which the later-described fluid material 50 will be filled is formed between the side walls 10a of the case and the side walls 40a of the mask. A size of the gap between the side walls 10a of the case and the side walls 40a of the mask (a minimal distance between the side walls 10a of the case and the side walls 40a of the mask) is not particularly limited as long as the fluid material 50 can be poured therebetween, and can be from 1.0 mm to 4.0 mm, and more preferably from 1.5 mm to 2.5 mm, for example. This is because if the size is equal to or smaller than 1.0 mm, it may be hard to pour the fluid material 50 efficiently using a nozzle or the like, and if the size is equal to or greater than 4.0 mm, a large amount of fluid material 50 is required, resulting in an increased cost as well as an increased time period for hardening the fluid material 50. The size of the gap between the side walls 10a of the case and the side walls 40a of the mask is not necessary to be the same, and the size of the gap may be formed to vary between a lengthwise direction and a short side direction of the display device, for example.

Further, a known method can be employed to fix the case 10, the substrate 20, and the mask 40. In the embodiment of the present invention, the fixation by screwing is employed, and the case 10, the substrate 20, and the mask 40 can be fixed using a total of 12 screws 60 in 3 (columns)×4 (rows), as illustrated in FIG. 3, for example.

Moreover, in FIG. 1D, a slight space is formed between the mask 40, the substrate 20, and the light emitting elements 30. However, the mask 40 may be in contact with at least one of the substrate 20 and the light emitting elements 30.

Furthermore, six brackets can be disposed between the case 10 and the substrate 20. The brackets are members for attaching the display device to the outside, and screws 60 are inserted from the rear side, and then the display device can be fixed to an external wall or the like with the brackets. Here, the substrate 20 can be held between the case 10 and the mask 40, and then the brackets are fixed by being fitted to the case 10.

Further, a packing can be provided on the back side of the case 10. Accordingly, in the case where the display device is attached to an external wall or the like, rain water can be prevented from entering between the display device and the external wall.

Fifth Step

Next, as illustrated in FIG. 1E, the fluid material 50 is filled between the side walls 10a of the case and the corresponding side walls 40a of the mask.

The fluid material 50 is filled so that the fluid material 50 is in contact with the outer surfaces of the side walls 10a of the case and the inner surfaces of the side walls 40a of the mask. In this manner, it is possible to provide a display device having superior waterproofness after hardening the fluid material 50 in a sixth step, to be described later.

Further, although FIG. 1F illustrates that the fluid material 50 is in contact with the substrate 20, there is no particular limitation in whether they are in direct contact or not, as long as the waterproofness of the display device is ensured, and it is possible to fill the fluid material 50 so as not to make contact with the substrate 20, that is, to a position spaced apart from the substrate 20 by controlling viscosity of the fluid material 50, to be described later.

Examples of a material of the fluid material 50 include a silicon resin, an epoxy resin, and a urethane resin. In the present embodiment of the present invention, a silicon resin is used.

Further, the viscosity of the fluid material 50 can be appropriately changed as necessary. For example, at 25° C., the viscosity is preferably from 0.5 Pa·s to 3.0 Pa·s, and more preferably from 1.0 Pa·s to 2.0 Pa·s. This is because if the viscosity is equal to or smaller than 0.5 Pa·s, the fluid material 50 may be poured into an undesired portion when the fluid material 50 is poured, and if the viscosity is equal to or greater than 3.0 Pa·s, it may become difficult to pour the fluid material 50 efficiently.

A known method can be employed to fill the fluid material 50. In the embodiment of the present invention, a tubular nozzle through which the fluid material 50 can be passed is used as illustrated in FIG. 1E. Accordingly, it is possible efficiently fill the fluid material 50 even into a narrow gap between the side walls 40a of the mask and the side walls 10a of the case.

Sixth Step

Next, the fluid material 50 is hardened.

A known method such as room temperature hardening, thermal hardening, and ultraviolet hardening can be employed to harden the fluid material 50. It is particularly preferable to employ room temperature hardening. With room temperature hardening, the fluid material 50 can be hardened without adding a load on the display device, and thus it is possible to perform the hardening while maintaining a desired shape of the mask 40 or the fluid material 50.

Further, it is possible to provide an outer frame so as to cover the hardened fluid material 50 and to be engaged with the side walls 10*a* of the case. Accordingly, it is possible to prevent the hardened fluid material 50 from being exposed, and thus suppress degradation of the hardened fluid material 50.

According to the method of manufacturing a display device of the embodiment of the present invention described above, it is possible to provide a display device having superior waterproofness, while preventing uneven brightness depending on a viewing position by preventing the mask 40 from being deformed to maintain a wide viewing angle of the display device.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the scope of the invention as defined in the appended claims. The present application is based on Application No. 2013-259,498 filed in Japan on Dec. 16, 2013, the content of which is incorporated herein by reference.

What is claimed is:

1. A method of manufacturing a display device, the method comprising:
    preparing a substrate provided with a plurality of light sources on a front side thereof, a case to be provided on a back side of the substrate, the case having a side wall along a periphery of the case, and a mask to be provided on the front side of the substrate, the mask having a light shielding member and a side wall projecting to the back side at a periphery of the mask, the light shielding member having a plurality of windows for transmitting light from the plurality of light sources, an outer shape of the mask being larger than an outer shape of the substrate and an outer shape of the case when viewed from the front side;
    fixing the case, the substrate, and the mask;
    filling a fluid material between the side wall of the case and the side wall of the mask; and
    hardening the fluid material.

2. The method of manufacturing a display device according to claim 1, wherein
    in the fixing the case, the substrate, and the mask, the substrate and the mask are fixed such that the outer shape of the substrate protrudes from the outer shape of the case.

3. The method of manufacturing a display device according to claim 1, wherein
    in the preparing the mask, the mask further including a light-transmissive member covering the windows of the light shielding member is prepared.

4. The method of manufacturing a display device according to claim 1, further comprising
    roughening an outer surface of the case side wall.

5. The method of manufacturing a display device according to claim 1, further comprising
    roughening an inner surface of the mask side wall.

6. The method of manufacturing a display device according to claim 1, wherein
    in the filling the fluid material, a resin is filled as the fluid material.

7. The method of manufacturing a display device according to claim 1, wherein
    the fixing is performed by screwing.

8. The method of manufacturing a display device according to claim 2, wherein
    in the preparing the mask, the mask further including a light-transmissive member covering the windows of the light shielding member is prepared.

9. The method of manufacturing a display device according to claim 2, further comprising
    roughening an outer surface of the case side wall.

10. The method of manufacturing a display device according to claim 2, further comprising
    roughening an inner surface of the mask side wall.

11. The method of manufacturing a display device according to claim 2, wherein
    in the filling the fluid material, a resin is filled as the fluid material.

12. The method of manufacturing a display device according to claim 2, wherein
    in the fixing the case, the substrate, and the mask, the fixing is performed by screwing.

13. The method of manufacturing a display device according to claim 1, wherein
    in the fixing the case, the substrate, and the mask, a gap between the side wall of the case and the side wall of the mask is from 1.0 mm to 4.0 mm.

14. The method of manufacturing a display device according to claim 1, wherein
    in the filling the fluid material, the fluid material is filled using a tubular nozzle.

15. The method of manufacturing a display device according to claim 2, wherein
    in the fixing the case, the substrate, and the mask, a gap between the side wall of the case and the side wall of the mask is from 1.0 mm to 4.0 mm.

16. The method of manufacturing a display device according to claim 2, wherein
    in the filling the fluid material, the fluid material is filled using a tubular nozzle.

17. The method of manufacturing a display device according to claim 1, wherein
    In the preparing the mask, a region where the side wall of the mask and the side wall of the case facing each other is from 1.5 mm to 5.0 mm in a depth direction of the display device.

18. The method of manufacturing a display device according to claim 2, wherein
    In the preparing the mask, a region where the side wall of the mask and the side wall of the case facing each other is from 1.5 mm to 5.0 mm in a depth direction of the display device.

* * * * *